(12) United States Patent
Su

(10) Patent No.: US 9,031,179 B2
(45) Date of Patent: May 12, 2015

(54) CALIBRATION OF CLOCK PATH MISMATCHES BETWEEN DATA AND ERROR SLICER

(71) Applicant: Oracle International Corporation, Redwood City, CA (US)

(72) Inventor: Jianghui Su, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 70 days.

(21) Appl. No.: 13/936,961

(22) Filed: Jul. 8, 2013

(65) Prior Publication Data

US 2015/0010121 A1 Jan. 8, 2015

(51) Int. Cl.
*H04L 7/00* (2006.01)
*H04B 17/00* (2006.01)

(52) U.S. Cl.
CPC .......... *H04L 7/0087* (2013.01); *H04B 17/0062* (2013.01)

(58) Field of Classification Search
USPC ........................................................ 375/355
See application file for complete search history.

(56) References Cited

U.S. PATENT DOCUMENTS

| | | | | |
|---|---|---|---|---|
| 7,272,742 B2 * | 9/2007 | Schoenfeld et al. | .......... | 713/503 |
| 7,515,664 B1 * | 4/2009 | Yeoh | .............................. | 375/354 |
| 8,401,064 B1 * | 3/2013 | Lin et al. | ....................... | 375/233 |
| 2013/0142245 A1 * | 6/2013 | Sindalovsky et al. | .......... | 375/233 |

* cited by examiner

*Primary Examiner* — Shuwang Liu
*Assistant Examiner* — Nader Bolourchi
(74) *Attorney, Agent, or Firm* — Marsh Fischmann & Breyfogle LLP; Daniel J. Sherwinter

(57) ABSTRACT

Embodiments include systems and methods for calibrating effective clock path mismatches in a receiver circuit. For example, a serializer/deserializer (SERDES) circuit includes a data slicer that generates data sampler decisions by sampling an input signal according to a clocking signal, and an error slicer that generates error slicer samples by sampling the input signal according to the clocking signal. Each of the data slicer and error slicer has an associated clock path delay, and the delays are typically different (e.g., due to manufacturing differences). A calibrator performs iteratively shifted sampling and comparing of the data sampler decisions and the error slicer samples over a plurality of clocking locations to determine an effective clock path mismatch. The calibrator can then determine and apply a clocking offset to the data slicer and/or the error slicer to effectively shift data and error sampling, thereby compensating for the effective clock path mismatch.

18 Claims, 8 Drawing Sheets

CALIBRATION OF CLOCK PATH MISMATCHES BETWEEN DATA AND ERROR SLICER

FIELD

Embodiments relate generally to receiver circuits, and, more particularly, to calibration of effective clock path mismatches between data slicers and error slicers in receiver circuit implementations.

BACKGROUND

Receiver circuits, like serializer/deserializer (SERDES) circuits, are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Often, the receiver circuit includes an analog-to-digital converter (ADC) circuit that attempts to converts a received analog serial signal into discrete bits. This can involve determining where bit transitions occur and what bit value to record, often in context of noisy data, small signal levels, and other difficult conditions. The ADC can be configured as a data slicer for generating data sampler decisions. The ADC can also include, or can be in communication with, error slicers for clock data recovery (CDR) and decision feedback equalization (DFE) adaptation. For various reasons, effective clock path mismatches can occur between the data slicers and error slicers, which can further frustrate accurate determination of serial bits from the analog signal.

BRIEF SUMMARY

Among other things, embodiments provide novel systems and methods for calibrating effective clock path mismatches between data slicers and error slicers in receiver circuit implementations. For example, a serializer/deserializer (SERDES) circuit includes a data slicer that generates data sampler decisions by sampling an input signal according to a clocking signal, and an error slicer that generates error slicer samples by sampling the input signal according to the clocking signal. Each of the data slicer and error slicer has an associated clock path delay and data path delay, and the delays are typically different (e.g., due to manufacturing differences). A calibrator performs iteratively shifted sampling and comparing of the data sampler decisions and the error slicer samples over a plurality of clocking locations to determine an effective clock path mismatch. The calibrator can then determine and apply a clocking offset to the data slicer and/or the error slicer to effectively shift data and error sampling, thereby compensating for the effective clock path mismatch.

According to one set of embodiments, a system is provided for determining a bit sequence from an input signal. The system includes: a data slicing subsystem that operates to generate data sampler decisions by sampling the input signal according to a clocking signal with respect to a reference level; an error slicing subsystem, in communication with the clock generator, that operates to generate error slicer samples by sampling the input signal according to the clocking signal with respect to an estimated signal value; and a calibration subsystem in communication with the data slicing subsystem and the error slicing subsystem. The calibration system operates to: compare the data sampler decisions with the error slicer samples to determine an effective clock mismatch window between the data slicing subsystem and the error slicing subsystem; and apply a clocking offset to at least one of the data slicing subsystem or the error slicing subsystem as a function of the determined effective clock mismatch window.

According to another set of embodiments, a method is provided for determining a bit sequence from an input signal. The method includes: generating a respective number of data sampler decisions for each of a number of clock locations by sampling an input signal according to a clocking signal using a data slicer subsystem; generating a respective number of error slicer samples for each of the number of clock locations by sampling the input signal according to the clocking signal using an error slicing subsystem; comparing the respective data sampler decisions with the respective error slicer samples for at least some of the clock locations to determine an effective clock mismatch window between the data slicing subsystem and the error slicing subsystem; and applying a clocking offset to at least one of the data slicing subsystem or the error slicing subsystem as a function of the determined effective clock mismatch window.

According to another set of embodiments, a serializer/deserializer (SERDES) circuit is provided. The SERDES circuit includes: a data slicing sub-circuit that operates to generate data sampler decisions by sampling an input signal according to a clocking signal with respect to a reference level, the data slicing sub-circuit having an associated first clock path delay; an error slicing sub-circuit that operates to generate error slicer samples by sampling the input signal according to the clocking signal with respect to an estimated signal value, the error slicing sub-circuit having an associated second clock path delay; and a calibration subsystem. The calibration subsystem operates to: perform iteratively shifted sampling and comparing of the data sampler decisions and the error slicer samples over a number of clocking locations to determine an effective clock path mismatch between the first clock path delay of the data slicing sub-circuit and the second clock path delay of the error slicing sub-circuit; and calibrate a clocking offset to shift sampling by the data slicing subsystem with respect to sampling by the error slicing subsystem in such a way that at least partially compensates for the effective clock path mismatch.

BRIEF DESCRIPTION OF THE DRAWINGS

The present disclosure is described in conjunction with the appended figures.

Figure 1:
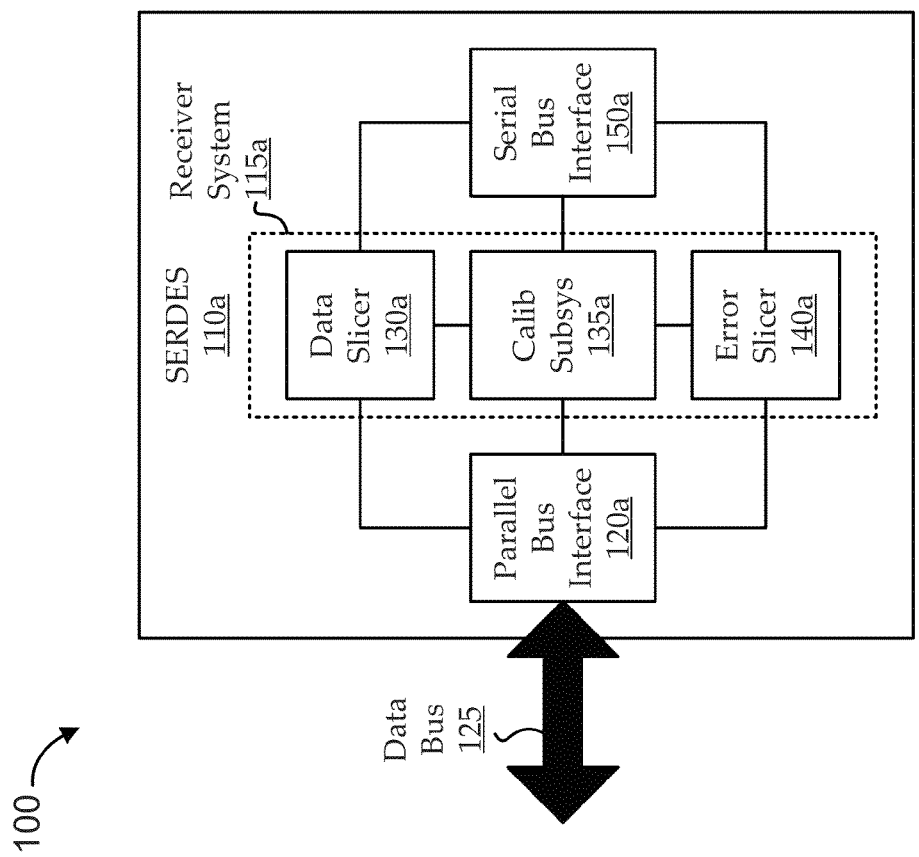
FIG. 1 shows a block diagram of an illustrative communications environment for use with various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Among other things, embodiments provide novel systems and methods for calibrating effective clock path mismatches between data slicers and error slicers in receiver circuit implementations. While features are described in context of error and data slicers of a serializer/deserializer (SERDES) circuit, similar techniques can be applied to other types of receiver circuits without departing from embodiments. In general, the data slicer operates to detect data transitions (e.g., from '0' to '1' or from '1' to '0') according to a reference level. The error slicer operates to determine an error value (or error slicer sample), which can be a difference in signal level between an estimated signal level and a sampled signal value. The error value can be used, for example, in clock data recovery (CDR) and decision feedback equalization (DFE) adaptation.

Typically, the data slicer and the error slicer circuits manifest differences in the amount of delay in their respective effective clock paths. This effective clock path mismatch can be composed of differences in clock paths and differences in data path speeds between the data and error slicers. For example, the effective clock path mismatch can be a manifestation of differences in manufacturing variation, design limitation, etc. While the data slicer and error slicer can receive the same input signal and the same sample clocking signal, the delay differences can cause the relative position of the sample clocking signal to the input signal in the data slicer to be different from the relative position of the sample clocking signal to the input signal in the error slicer. Accordingly, when each of the data slicer and the error slicer is clocked to sample the input signal at substantially the same time (i.e., relative to each other), the sampling may actually occur at different times relative to the input signal due to the effective clock path mismatch. Particularly when the input signal switches at high speeds, small timing mismatches can potentially cause undesirable effects, such as reduced link margin, incorrect bit determinations, etc.

Embodiments determine and introduce a clock path delay into one or both of the data slicer and error slicer clock paths to compensate for mismatches that are otherwise present in their respective clock paths. In one implementation, an estimated signal level used as a reference for the error slicer is normalized to the reference level of the data slicer. In this way, the "eye" of the input signal as seen by the error slicer is normalized to look effectively like a time-shifted version of the eye of the input signal as seen by the data slicer (e.g., both show the same transitions, though shifted in time). A clock location is shifted, while the data slicer and error slicer perform sampling and those samples (i.e., data sampler decisions and error slicer samples) are compared, to estimate an effective clock path mismatch window. An appropriate clock path delay can then be determined and introduced into the data slicer and/or error slicer clock paths, effectively compensating for mismatches that are otherwise present (e.g., minimizing the mismatch window).

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Turning first to FIG. 1, a block diagram is shown of an illustrative communications environment 100 for use with various embodiments. The communications environment 100 includes a data bus 125 that interfaces with a serializer/deserializer (SERDES) 110. The SERDES 110 is shown in a simplified form as having a parallel bus interface 120 and a serial bus interface 150, both in communication with a receiver system 115 (e.g., a receiver circuit). The parallel bus interface 120 can include any components and functionality suitable for interfacing the SERDES 110 with parallel data from the data bus 125, and the serial bus interface 150 can include any components and functionality suitable for outputting serialized data (e.g., for communication over a serial data bus).

As illustrated, the receiver system 115 includes a data slicer subsystem 130, an error slicer subsystem 140, and a calibration subsystem 135. The data slicer subsystem 130 operates to detect data transitions (e.g., from '0' to '1' or from '1' to '0') according to a reference level (referred to herein as "data sampler decisions"). For example, the reference level can be at zero volts or any other suitable level. The error slicer subsystem 140 operates to determine a difference in signal level (e.g., magnitude) between an estimated signal level and a sampled signal value. This difference, which is referred to herein as an "error value" or "error slicer sample," can be used, for example, in clock data recovery (CDR) and decision feedback equalization (DFE) adaptation.

Typically, each of the data slicer subsystem 130 and the error slicer subsystem 140 samples a received signal according to a clock generated by the calibration subsystem 135. In some implementations, the calibration subsystem 135 generates a reference clock from the received data signal and/or from internal clock components. The generated clock can be used by the calibration subsystem 135 to trigger each of the data slicer subsystem 130 and the error slicer subsystem 140 to sample the received input signal, thereby generating a data sampler decision and an error slicer sample corresponding to that sample time. As described below, the calibration subsystem 135 can also calibrate effective clock path mismatches between the data slicer subsystem 130 and the error slicer subsystem 140.

The various subsystems and components can be implemented in any suitable manner, and the various operations of methods and functions of certain system components can be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For example, the SERDES 110 is a SERDES circuit having receiver circuitry. The receiver circuitry includes the data slicer subsystem 130 as a data slicing sub-circuit, the error slicer subsystem 140 as an error slicing sub-circuit, and the calibration subsystem 135 as a calibration sub-circuit. The data slicing sub-circuit generates data sampler decisions by sampling an input signal according to a clocking signal with respect to a reference level. The error slicing sub-circuit generates error slicer samples by sampling the input signal according to the clocking signal with respect to an estimated signal value. The calibration sub-circuit, as described more fully below, operates to perform iteratively shifted sampling and comparing of the data sampler decisions and the error slicer samples over a plurality of clocking locations to determine an effective clock path mismatch between the first clock path delay of the data slicing sub-circuit and the second clock path delay of the error slicing sub-circuit, and to calibrate a clocking offset to shift sampling by the data slicing subsystem with respect to sampling by the error slicing subsystem in such a way that at least partially compensates for the effective clock path mismatch.

Figure 2:
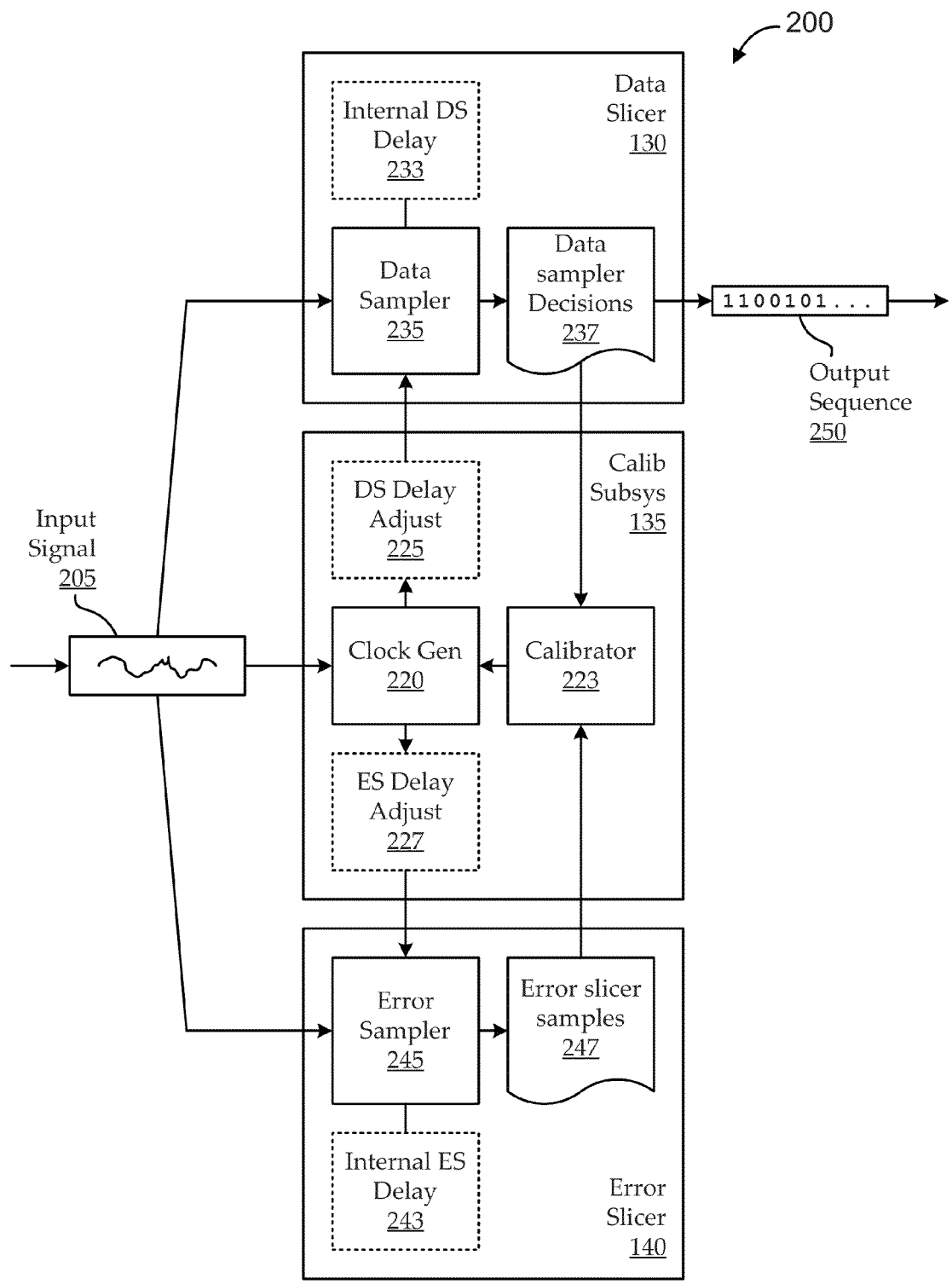
FIG. 2 shows a simplified block diagram of an illustrative receiver system, according to various embodiments.

FIG. 2 shows a simplified block diagram of an illustrative receiver system 200, according to various embodiments. The receiver system 200 can be an implementation of the receiver system 115 of FIG. 1. The receiver system 200 includes a data slicer subsystem 130, an error slicer subsystem 140, and a calibration subsystem 135. An input signal 205 is received by the components of the receiver system 200, and the receiver system 200 generates an output sequence 250 (e.g., a digital signal, a series of bits, etc.). As illustrated, even though the input signal 205 may represent digital data, it is received substantially as an analog signal by the components of the receiver system 200.

Embodiments of the calibration subsystem 135 include a clock generator 220 that generates one or more clocks for components of the receiver system 200. Some implementations generate a reference clock from the received input signal 205 and/or from other sources. In certain embodiments, the calibration subsystem 135 then generates one or more clock signals from the reference clock, for example, at higher clock frequencies and/or with other characteristics. For example, the input signal 205 (e.g., from a parallel data bus) operates at two gigabits per second (gbps). The clock generator 220 can derive a two-gbps clock from the input signal 205, which it can step up to a twenty-gigabit per second clock for use by the receiver system 200 (e.g., using a phase-lock loop and/or any other suitable components).

Embodiments of the data slicer subsystem 130 can effectively operate as an analog to digital converter (ADC) that converts the input signal 205 into the digital output sequence. This can involve deriving bit values and/or transitions from the input signal 205, often in context of noisy data, small signal levels (small link margin), and other difficult conditions. Typically, operations of the data slicer subsystem 130 are driven by a clocking signal generated by the calibration subsystem 135. For example, a data sampler 235 of the data slicer subsystem 130 records a sample of the input signal 205 at a sample time according to the clock signal. The data sampler 235 can compare the sampled signal magnitude to a reference level (e.g., zero volts or any other suitable level) to generate a data sampler decision 237. For example, the data sampler decision 237 corresponds to a '1' or '0'.

Embodiments of the error slicer subsystem 140 operate to record errors between estimated signal levels and sampled signal levels. Similar to the data slicer subsystem 130, operations of the error slicer subsystem 140 are typically driven by the clocking signal generated by the calibration subsystem 135. For example, an error sampler 245 of the error slicer subsystem 140 records a sample of the input signal 205 at a sample time according to the clock signal. The error sampler 245 can compare the sampled signal magnitude to an estimated signal level (e.g., an expected '1' or '0' level) to generate an error slicer sample 247. The error slicer sample can be used for any suitable purpose, for example, for clock data recovery (CDR) and/or decision feedback equalization (DFE) adaptation.

As illustrated, the data slicer subsystem 130 has an internal data slicer delay 233, and the error slicer subsystem 140 has an internal error slicer delay 243. For example, in any circuit, there tends to be a delay between receipt of a signal at one location in the circuit and response to the signal at another location in the circuit. In the case of a clock signal, each of the data slicer subsystem 130 and the error slicer subsystem 140 experiences a delay between receipt of the clock signal and use of the clock signal for sampling by a component of the subsystem (e.g., by the data sampler 235 or error sampler 245, respectively). This delay is referred to herein as a clock path delay, and is at least partially a function of the internal data slicer delay 233 and the internal error slicer delay 243 for the data slicer subsystem 130 and the error slicer subsystem 140, respectively.

Differences in the implementations of the data slicer subsystem 130 and the error slicer subsystem 140 tends to manifest as differences between the internal data slicer delay 233 and the internal error slicer delay 243. For example, differences in manufacturing, component selection, signal path length, etc. between the subsystems can cause the clock signal to take more or less time to trigger data or error sampling. This difference is referred to herein as a "effective clock path mismatch," a "mismatch window," or the like. As described more fully below, the effective clock path mismatch can cause data sampling by the data slicer subsystem 130 to occur at one time relative to the input signal 205 and error sampling by the error slicer subsystem 140 to occur at another time relative to the input signal 205, even though the data slicer subsystem 130 and the error slicer subsystem 140 are receiving the same input signal 205 and the same clocking signal. These mismatches can have undesirable effects, including reduced link margin, incorrect bit determinations, etc. These limitations can be at least partially addressed using a calibrator 223 to determine and apply one or both of a data slicer clock delay adjustment 225 or an error slicer clock delay adjustment 227, as described more fully below.

Figure 3:
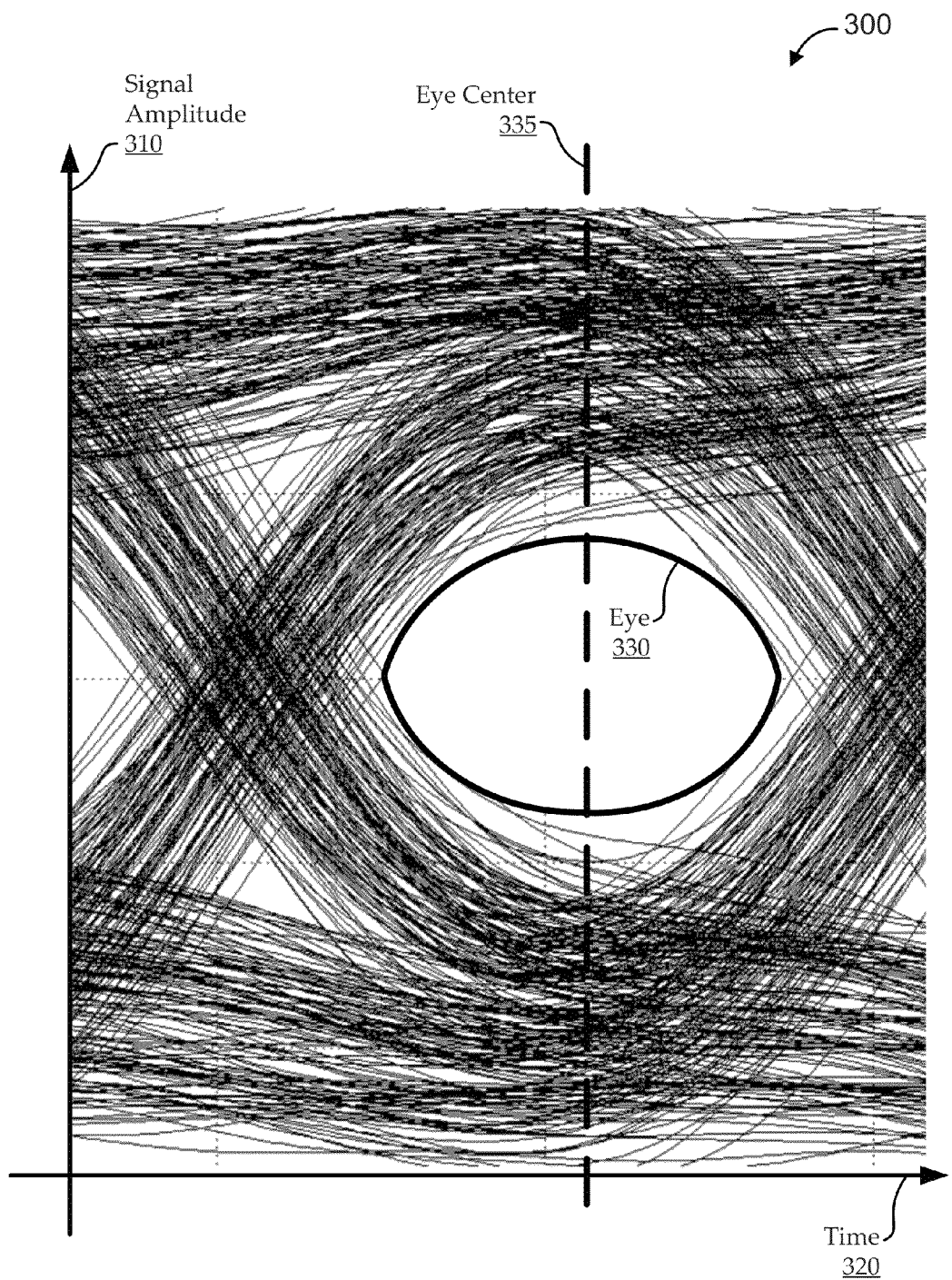
FIG. 3 shows a graph with a number of illustrative input signal traces that form a data eye.

For the sake of illustration, FIG. 3 shows a graph 300 with a number of input signal traces. The graph 300 is a plot of signal amplitude 310 on the Y-axis versus time 320 on the X-axis for many "transitions" of an illustrative input signal 205. For example, the many traces include data transitions from '0' to '0', '0' to '1', '1' to '0', and '1' to '1'. When superimposed on one another, an "eye" 330 forms in the data. The eye center 335 can represent the location in the data having the greatest link margin. For example, calibrating sampling of the input signal 205 with the eye center 335 can tend to produce the highest likelihood that the resulting data sampler decisions 237 will accurately represent the input signal 205 data.

In many receiver circuits, the error slicer samples 247 generated by the error slicer subsystem 140 are used to detect that the input signal 205 is not being sampled at the eye center 335. For example, if the estimated magnitude of a '1' at the eye center 335 is one millivolt, and the error slicer subsystem 140 samples a signal level of 0.8 millivolts, the 0.2-millivolt difference can indicate that the error slicer subsystem 140 is sampling the data in a location that is shifted from the eye center 335. Traditionally, the sampling location is assumed to be correspondingly shifted in the data slicer subsystem 130, and the error slicer samples 247 can be used to adaptively shift the sampling location of the data slicer subsystem 130 in an attempt to increase link margins. However, effective clock path mismatch between the data slicer subsystem 130 and the error slicer subsystem 140 can limit the effectiveness of that approach.

Figure 4A:
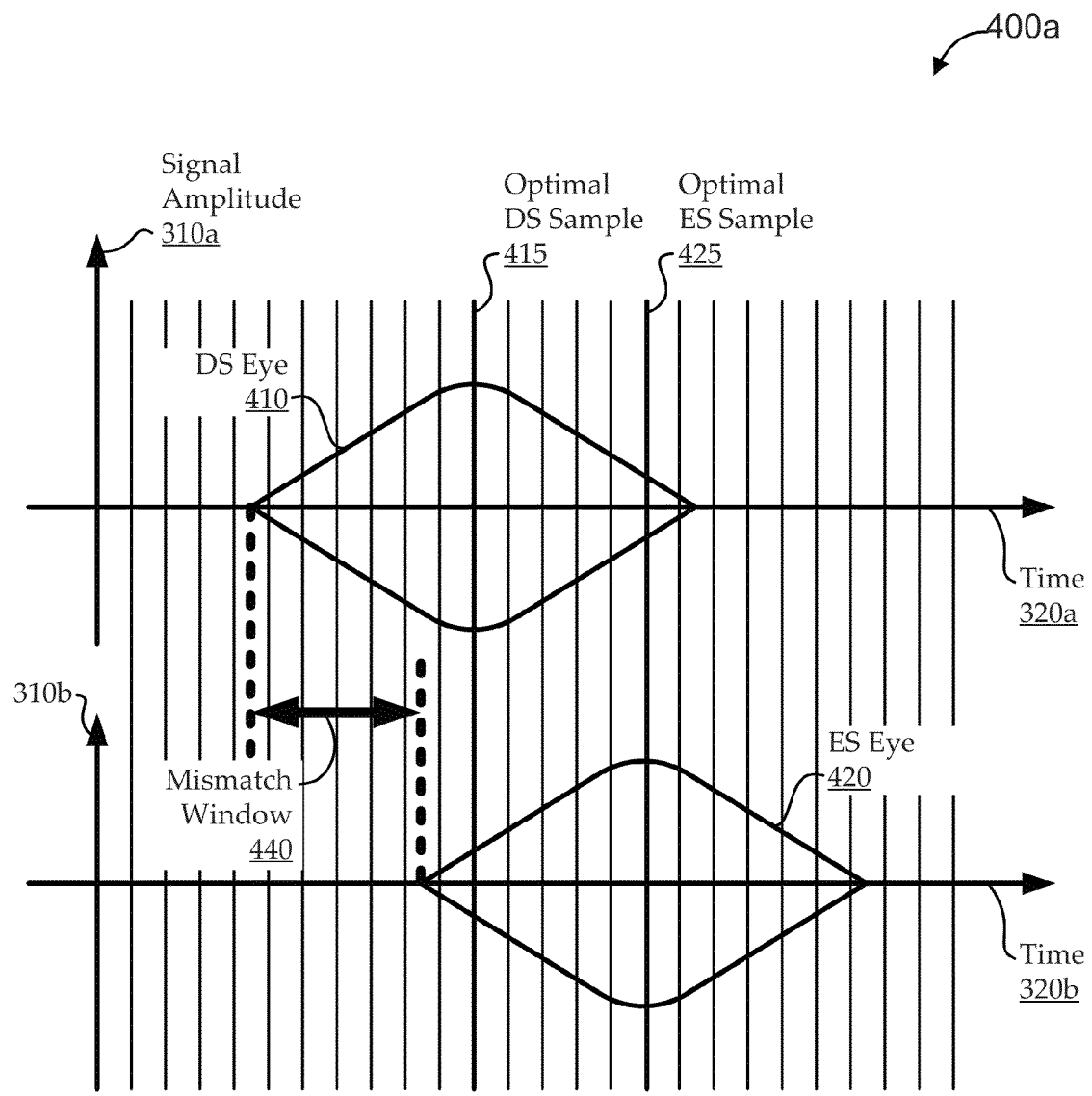
FIG. 4A shows graphs of an illustrative input signal data eye from the perspective of a data slicer subsystem and an error slicer subsystem, respectively.

For example, FIG. 4A shows graphs 400a of an illustrative input signal data eye from the perspective of a data slicer subsystem 130 and an error slicer subsystem 140, respectively. As in FIG. 3, the graphs are plots of signal amplitude 310 on each Y-axis versus time 320 on each X-axis. A first data eye 410 indicates a location of a particular data eye of an illustrative input signal from the perspective of a data slicer subsystem 130. As optimal data slicer sampling location 415 is also shown at the eye center of the first data eye 410. A second data eye 420 indicates a location of the same particular data eye from the perspective of an error slicer subsystem 140. As optimal error slicer sampling location 425 is also shown at the eye center of the second data eye 420. As described above, effective clock path mismatch between the data slicer subsystem 130 and the error slicer subsystem 140 manifests as a mismatch window 440 between the effective temporal location of the data eye from the perspective of each subsystem.

Suppose that an initial sampling location happens to correspond with the optimal data slicer sampling location 415. While this sample is at the eye center of the first data eye 410, it is at the tail of the second data eye 420 (i.e., shifted from the eye center of the second data eye 420 by approximately the mismatch window 440). In a traditional receiver system implementation, the error slicer subsystem 140 would detect an appreciable difference between estimated and sample data values at that location and would likely attempt to adaptively shift the sample location toward the optimal error slicer sampling location 425. Shifting the sampling toward the optimal error slicer sampling location 425 would shift the sampling away from the optimal data slicer sampling location 415, thereby reducing the link margin and potentially reducing the accuracy of the data sampler decisions recorded by the data slicer subsystem 130.

Figure 4B:
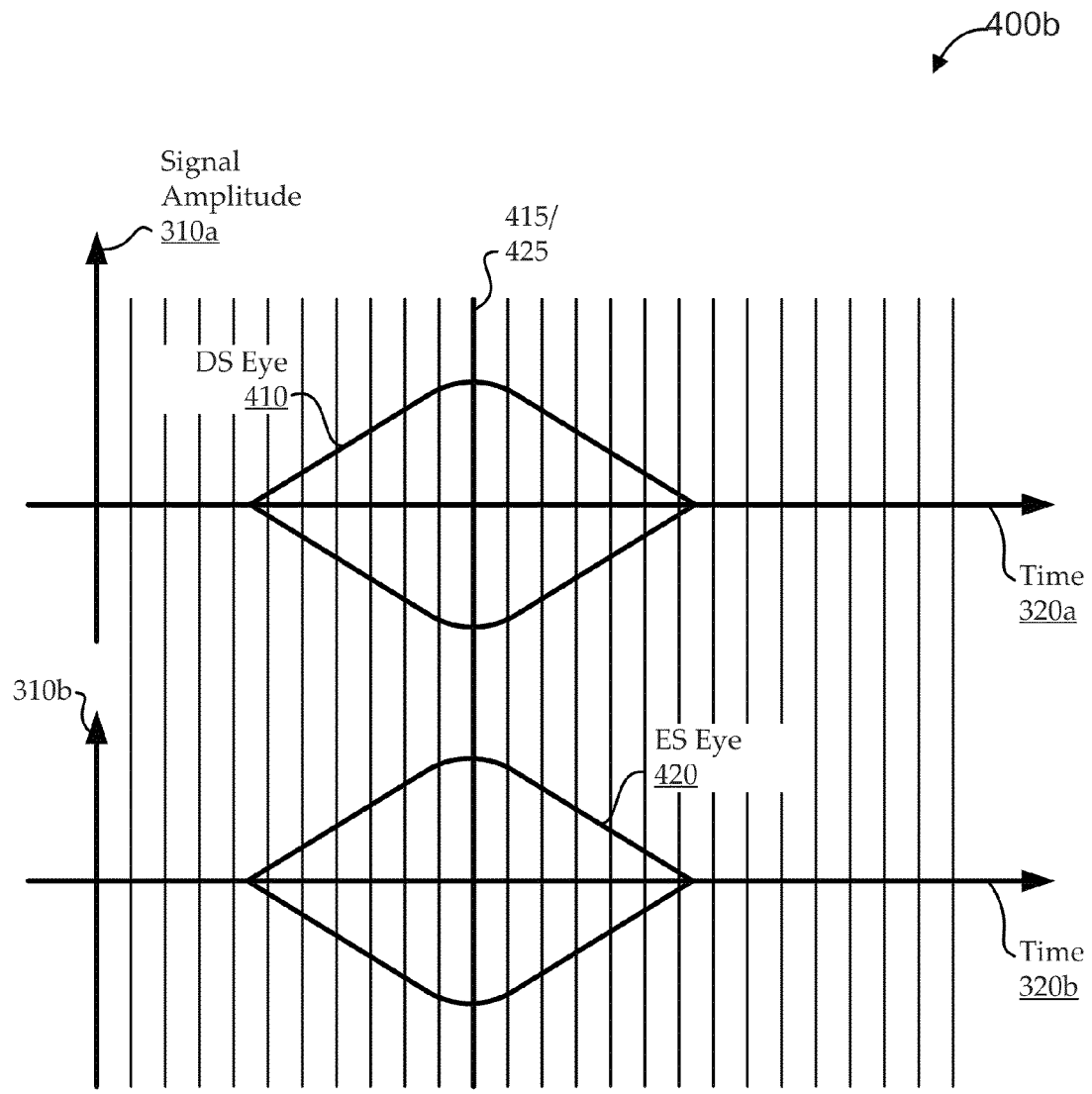
FIG. 4B shows graphs representing a shifted version of the graphs of FIG. 4A.

FIG. 4B shows graphs 400b representing a shifted version of the graphs 400a of FIG. 4A. In FIG. 4B, one or both of the data slicer subsystem 130 and error slicer subsystem 140 perspectives have been shifted to substantially align their respective data eye centers. Embodiments described herein perform this type of alignment by calibrating the sample locations of the subsystems in an attempt to compensate for the respective effective clock path mismatches. As illustrated, with the data eyes substantially aligned, the optimal data slicer sampling location 415 is in substantially the same location as the optimal error slicer sampling location 425. With the subsystems calibrated in this way, adaptive functionality of the error slicer subsystem 140 can be used to accurately adapt the sampling location of the data slicer subsystem 130.

Figure 5:
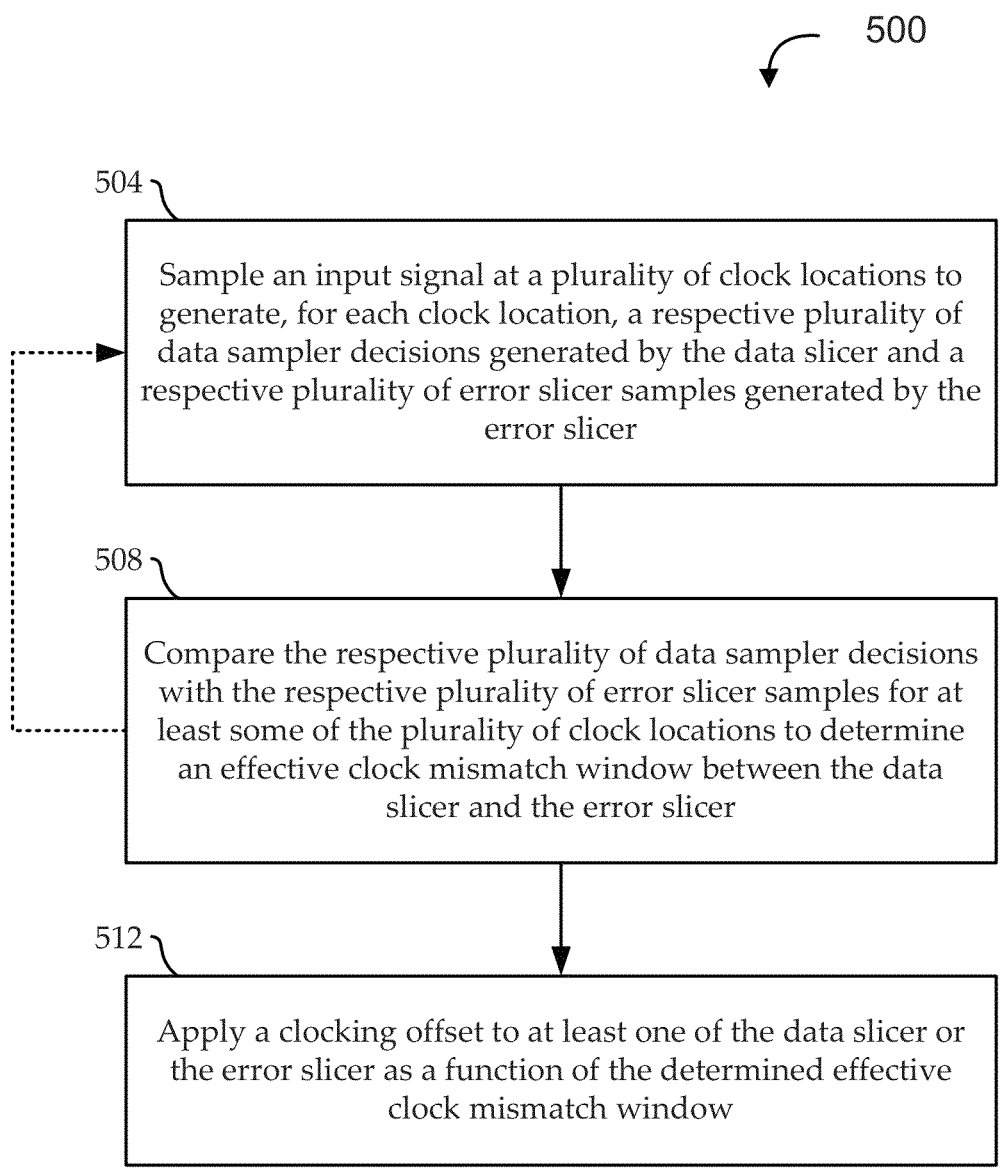
FIG. 5 shows a flow diagram of an illustrative method for performing effective clock mismatch calibration, according to various embodiments.

FIG. 5 shows a flow diagram of an illustrative method 500 for performing effective clock mismatch calibration, according to various embodiments. For the sake of clarity, the method 500 is described in context of the receiver system 200 of FIG. 2. Embodiments of the method 500 begin at stage 504 by sampling an input signal at a number of clock locations to generate, for each clock location, a respective number of data sampler decisions generated by the data slicer and a respective number of error slicer samples generated by the error slicer. For example, at an initial clock location, the data slicer subsystem 130 records one thousand data sampler decisions, and the error slicer subsystem 140 records one thousand error slicer samples. The clock location is shifted over to a next clock location by some amount that is appreciably less than the data rate (e.g., clock frequency) of the input signal. At this next clock location, the data slicer subsystem 130 records another one thousand data sampler decisions, and the error slicer subsystem 140 records another one thousand error slicer samples.

At stage 508, at each clock location (or for at least some of the clock locations), the respective data sampler decisions generated by the data slicer are compared with the respective error slicer samples generated by the error slicer to determine an effective clock mismatch window between the data slicer and the error slicer. For example, it can generally be assumed that there will be at least some discrepancies between the data sampler decisions and the error slicer samples at the initial clock location. After some number of shifts in the clock location, a clock location can be reached at which the data sampler decisions match the error slicer samples. This can be visualized, for example with reference to FIG. 4A, as one edge of a region over which the data eye 410 of the data slicer and the data eye 420 of the error slicer overlap. After some additional number of shifts in the clock location, a clock location can be reached at which the data sampler decisions no longer match the error slicer samples. This can be visualized, for example with reference again to FIG. 4A, as the other edge of the region over which the data eye 410 of the data slicer and the data eye 420 of the error slicer overlap.

As can be seen from FIG. 4A, for example, the region of overlap between data eye 410 and data eye 420 is effectively a corollary to the effective clock path mismatch window 440. Accordingly, some embodiments described as determining the mismatch window actually determine the region of overlap; while other embodiments use similar techniques to determine the mismatch window directly. Similarly, embodiments described as minimizing the mismatch window actually maximize the region of overlap; while other embodiments use similar techniques to minimize the mismatch window directly. Further, terms like "maximize," "minimize," "edge," and the like are intended only to provide clarity and a relative sense of direction, location, etc. For example, embodiments described as identifying an "edge" of the mismatch window may identify a clock location at which data samples at that location differ from data samples at an adjacent location, which may, in fact, only be near (rather than at) the edge of the window.

As described herein, in some implementations, the comparison at stage 508 involves normalizing the sampled data. For example, embodiments of the data slicer subsystem 130 generate data sampler decisions by comparing the input signal to a reference level (e.g., zero volts), and embodiments of the error slicer subsystem 140 generate error slicer samples by comparing the input signal to an estimated signal level. Prior to comparing the data sampler decisions with the error slicer samples, implementations normalize them to a common reference. In one implementation, the estimated signal level used by the error slicer subsystem 140 is forced to the reference level used by the data slicer subsystem 130. Other types of normalization and/or other data processing can be performed to facilitate the comparison.

Figure 6:
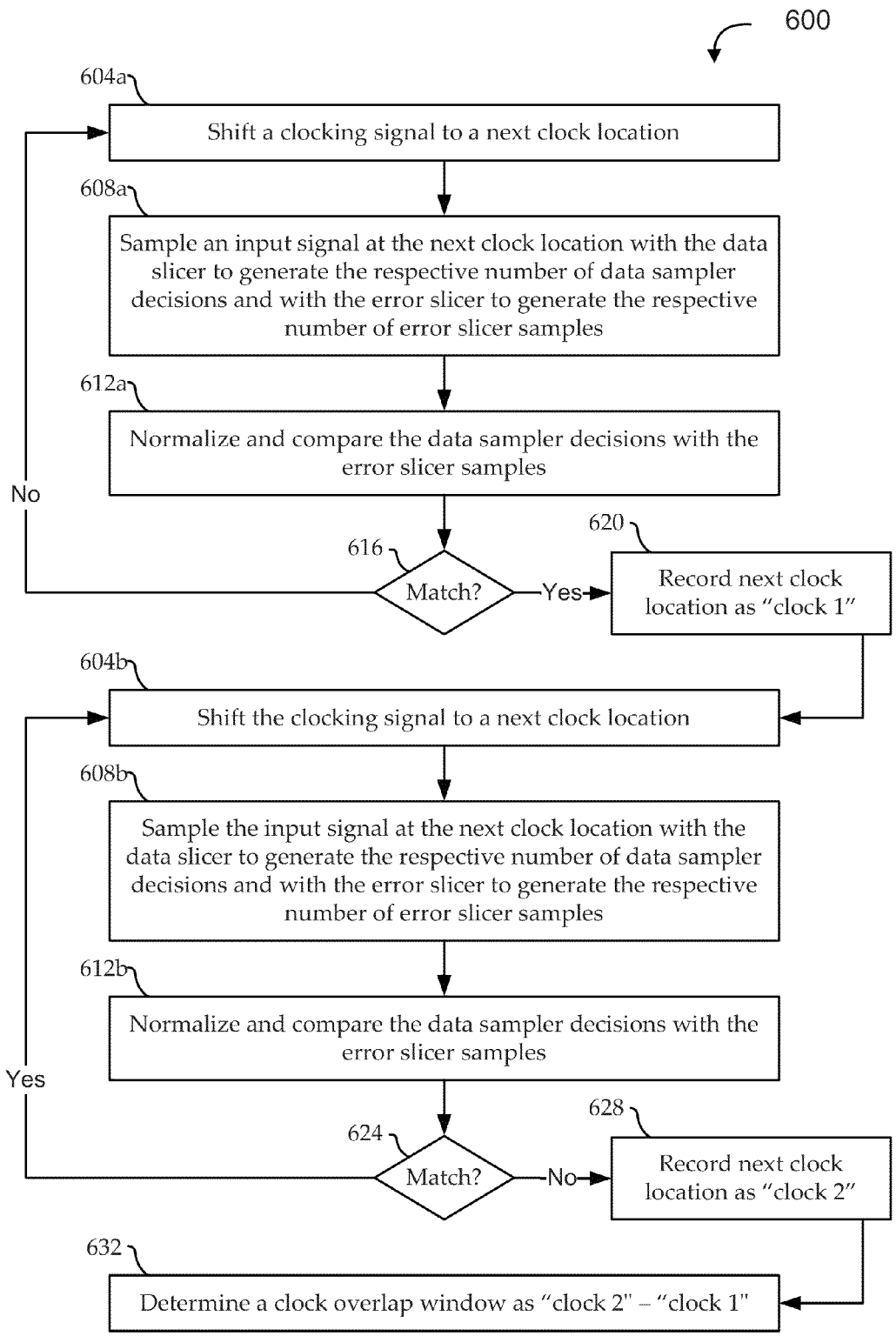
FIG. 6 shows a flow diagram of an illustrative method for determining the effective clock mismatch window, according to various embodiments.

For added clarity, FIG. 6 shows a flow diagram of an illustrative method 600 for determining the effective clock mismatch window (or its corollary) as in stages 504 and 508 of FIG. 5, according to various embodiments. Embodiments of the method 600 begin at stage 604a by shifting a clocking signal to a next clock location (e.g., from an initial clock location). For example, the data rate of the input signal is two gbps, so that samples are generated by the data slicer and error slicer approximately once every half-nanosecond. In that example, clock location may be shifted by fractions of a nanosecond.

At stage 608a, the input signal is sampled at the next clock location with the data slicer to generate the respective number of data sampler decisions and with the error slicer to generate the respective number of error slicer samples (e.g., as described above with reference to stage 504 of FIG. 5). The sampled data (i.e., the data sampler decisions and the error slicer samples) can be normalized and compared at stage 612a. A determination can be made at stage 616 as to whether the data sampler decisions and error slicer samples match. If not, the method 600 iterates back to stage 604a to try a next-adjacent clock location. As described above, it is assumed that the sampled data does not match at the initial clock position, so that implementations of the method 600 are likely to iterate through stages 604a-612a at least twice before a match is detected at stage 616. If it is determined at stage 616 that the data sampler decisions match the error slicer samples, the clock location where that match is detected can be recorded (e.g., as "clock 1") at stage 620. As described above, the "clock 1" location can be one edge of an overlap region between data eyes from the relative perspectives of the data slicer and error slicer.

Embodiments of the method 600 continue at stage 604b by shifting a clocking signal to a next clock location (e.g., from the "clock 1" location). At stage 608b, the input signal is sampled at the next clock location with the data slicer to generate the respective number of data sampler decisions and with the error slicer to generate the respective number of error slicer samples. The sampled data can be normalized and compared at stage 612b. Another determination can be made at stage 624 as to whether the data sampler decisions and error slicer samples match. If so, the method 600 iterates back to stage 604b to try a next-adjacent clock location. Because the data matched at the "clock 1" location, it is likely (though not necessary) that the data will continue to match for a number of iterations through stages 604b-612b. After some number of iterations, however, a clock location will be reached at which the data sampler decisions and the error slicer samples no longer match. When it is determined at stage 624 that the data sampler decisions do not match the error slicer samples, the clock location where that is detected can be recorded (e.g., as "clock 2") at stage 628. As described above, the "clock 2" location can be the other edge of the overlap region between data eyes from the relative perspectives of the data slicer and error slicer. A clock overlap window (e.g., the corollary to the effective clock mismatch window) can be determined at stage 632 as the region between the "clock 2" location and the "clock 1" location.

Returning to FIG. 5, at stage 512, a clocking offset is applied to at least one of the data slicer or the error slicer as a function of the determined effective clock mismatch window (or clock overlap window). For example, having determined the amount of mismatch, clocking for one or both of the data slicer subsystem 130 and the error slicer subsystem 140 can be offset in an attempt to minimize that mismatch window.

Embodiments seek to offset the data slicer clock relative to the error slicer clock (or vise versa) to effectively shift mismatched data eyes to have a maximum amount of overlap (e.g., ideally complete overlap, but that is generally not practical). For the sake of illustration, data eyes that would otherwise appear as shown in FIG. 4A are shifted to look more like the data eyes shown in FIG. 4B.

Figure 7:
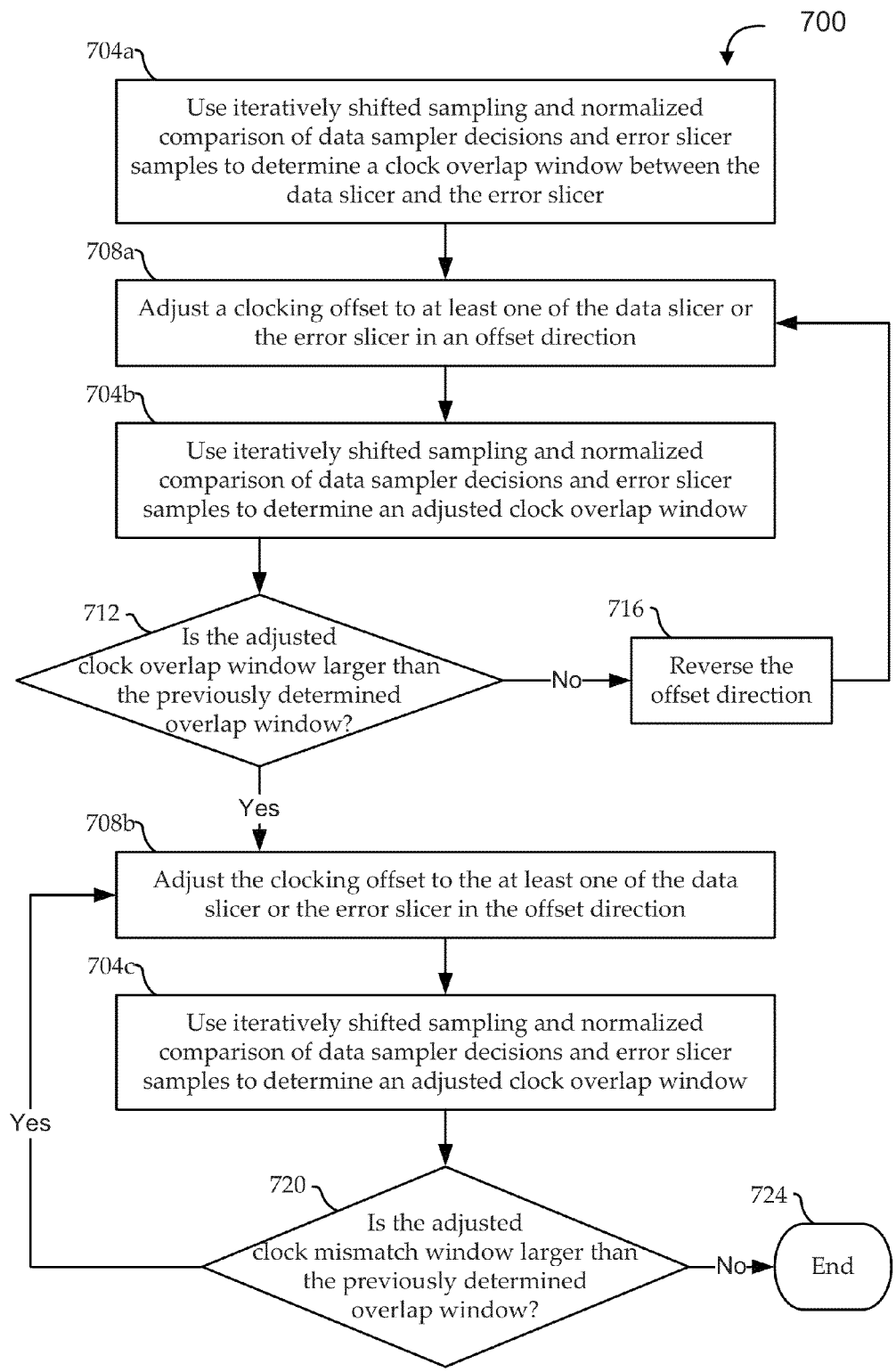
FIG. 7 shows a flow diagram of an illustrative method for determining and applying a clocking offset, according to various embodiments.

For added clarity, FIG. 7 shows a flow diagram of an illustrative method 700 for determining and applying a clocking offset as in stage 512 of FIG. 5, according to various embodiments. Embodiments of the method 700 begin at stage 704a by using iteratively shifted sampling and normalized comparison of data sampler decisions and error slicer samples to determine a clock overlap window (or effective clock mismatch window) between the data slicer and the error slicer. For example, stage 704a can be performed according to the method 600 of FIG. 6. At stage 708a, a clocking offset is adjusted to at least one of the data slicer or the error slicer in an offset direction. For example, as illustrated in FIG. 2, embodiments can include a data slicer delay adjust 225 and/or an error slicer delay adjust 227. Either or both can be adjusted to effectively shift their respective clocking relative to one another. The clocking can be offset in any suitable manner. In one implementation, an adjustable delay component is included in the circuitry to add delay to the clock path of the data slicer or the error slicer. For example, implementations can seek to adjust the clock delay to minimize any difference between the total data slicer delay (e.g., the sum of the internal data slicer delay 233 and the data slicer delay adjust 225) and the total error slicer delay (e.g., the sum of the internal error slicer delay 243 and the error slicer delay adjust 227).

At stage 704a, iteratively shifted sampling and normalized comparison of data sampler decisions and error slicer samples are again used to determine a clock overlap window. It is assumed that offsetting the relative clocking of the data slicer and the error slicer adjusts the effective clock mismatch window. For example, the adjustment of the clocking offset in the offset direction at stage 708a has reduced the difference between the total data slicer delay and the total error slicer delay, the overlap window should be larger (as desired). If the offset direction is incorrect, the clocking offset adjustment can cause the overlap window to shrink. A determination is made at stage 712 as to whether the adjusted overlap window (i.e., after the clocking offset is adjusted at stage 708a) has increased. If not, the offset direction can be reversed at stage 716. In some implementations, changing the offset direction can involve reversing the direction of offset being applied to a particular one of the data slicer or error slicer. In other implementations, changing the offset direction can involve changing the relative offset between the data slicer and the error slicer. For example, some delay circuitry can only add delay in one direction. However, a total offset provided by summing delays from both the data slicer delay adjust 225 and the error slicer delay adjust 227 can be used to effectively adjust the offset in either direction relatively. Having reversed the direction at stage 716 (e.g., presumably having determined the appropriate offset direction), the method 700 can iterate through stages 708a and 704b. After either of the first or second iteration through stages 708a and 704b, the determination at stage 712 can indicate that the adjusted overlap window has increased.

Embodiments of the method 700 can continue to adjust the offset in the offset direction and monitor the overlap window to determine where the overlap is substantially maximized. At stage 708b, the clocking offset is again adjusted to at least one of the data slicer or the error slicer in the offset direction (as originally set or as reversed). At stage 704c, iteratively shifted sampling and normalized comparison of data sampler decisions and error slicer samples are again used to determine an adjusted clock overlap window. A determination is made at stage 720 (which can be similar or identical to the determination made at stage 712) as to whether the adjusted overlap window (i.e., after the clocking offset is adjusted at stage 708b) has continued to increase. Embodiments can continue to iterate through stages 708b and 704c until the determination at stage 720 indicates that the overlap window is no longer increasing. At that amount of offset, the method 700 can end. That clocking offset value (which may be multiple values if multiple offset components are used) can be used for calibration of the receiver system.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for determining a bit sequence from an input signal, the system comprising:
   a data slicing subsystem that operates to generate data sampler decisions by sampling the input signal according to a clocking signal with respect to a reference level;
   an error slicing subsystem that operates to generate error slicer samples by sampling the input signal according to the clocking signal with respect to an estimated signal value; and
   a calibration subsystem, in communication with the data slicing subsystem and the error slicing subsystem, that operates to:
   compare the data sampler decisions with the error slicer samples to determine an effective clock mismatch window between the data slicing subsystem and the error slicing subsystem by:
      iteratively sampling the input signal to generate respective pluralities of data sampler decisions and error slicer samples over a first plurality of clocking locations, and comparing the respective pluralities of data sampler decisions and error slicer samples for each first clocking location until a first window edge is identified;
      iteratively sampling the input signal to generate respective pluralities of data sampler decisions and error slicer samples over a second plurality of clocking locations adjacent to the first plurality of clocking locations, and comparing the respective pluralities of data sampler decisions and error slicer samples for each second clocking location until a second window edge is identified; and
      determining the effective clock mismatch window according to the first window edge and the second window edge; and
   apply a clocking offset to at least one of the data slicing subsystem or the error slicing subsystem as a function of the determined effective clock mismatch window.

2. The system of claim 1, wherein iteratively sampling the input signal to generate respective pluralities of data sampler decisions and error slicer samples over the first and second plurality of clocking locations, and comparing the respective pluralities of data sampler decisions and error slicer samples for each first and second clocking location until the first and second window edges are identified comprises:
   shifting the clocking signal to each of the first and second plurality of clocking locations in a shifting direction, and, at each clocking location:
   generating a respective plurality of data sampler decisions by sampling the input signal according to the clocking signal using the data slicer subsystem;
   generating a respective plurality of error slicer samples by sampling the input signal according to the clocking signal using the error slicing subsystem; and
   comparing the respective plurality of data sampler decisions with the respective plurality of error slicer samples, wherein the first window edge is identified when, at one of the first clocking locations, the respective plurality of data sampler decisions matches the respective plurality of error slicer samples, and wherein the second window edge is identified when, at one of the second clocking locations, the respective plurality of data sampler decisions does not match the respective plurality of error slicer samples.

3. The system of claim 1, wherein the calibration subsystem operates to apply the clocking offset to at least one of the data slicing subsystem or the error slicing subsystem so as to temporally shift sampling by the data slicing subsystem with respect to sampling by the error slicing subsystem in such a way that compensates for effective clock path mismatch between the data slicing subsystem and the error slicing subsystem.

4. The system of claim 1, wherein the calibration subsystem operates to apply the clocking offset to at least one of the data slicing subsystem or the error slicing subsystem as a function of the determined effective clock mismatch window by:

iteratively adjusting a candidate clocking offset applied to one of the data slicing subsystem or the error slicing subsystem, and determining an adjusted effective clock mismatch window at each candidate clocking offset, until the adjusted effective clock mismatch window indicates a minimized effective clock path mismatch.

5. The system of claim 1, wherein the calibration subsystem operates to compare the data sampler decisions with the error slicer samples by normalizing the data sampler decisions and the error slicer samples to a common reference.

6. The system of claim 5, wherein the normalizing the data sampler decisions and the error slicer samples to a common reference level comprises forcing the estimated signal value used by the error slicing subsystem to the reference level used by the data slicing subsystem.

7. The system of claim 1, further comprising a clock generator that operates to generate the clocking signal.

8. The system of claim 7, wherein the clock generator operates to generate the clocking signal by deriving a reference clock from the input signal and generating the clocking signal as a function of the reference clock.

9. The system of claim 1, wherein determining the effective clock mismatch window comprises determining a clock overlap window.

10. A method for determining a bit sequence from an input signal, the method comprising:

generating a respective plurality of data sampler decisions for each of a plurality of clock locations by sampling an input signal according to a clocking signal using a data slicer subsystem;

generating a respective plurality of error slicer samples for each of the plurality of clock locations by sampling the input signal according to the clocking signal using an error slicing subsystem;

comparing the respective plurality of data sampler decisions with the respective plurality of error slicer samples for at least some of the plurality of clock locations to determine an effective clock mismatch window between the data slicing subsystem and the error slicing subsystem by:

iteratively sampling the input signal to generate respective pluralities of data sampler decisions and error slicer samples over a first plurality of clocking locations, and comparing the respective pluralities of data sampler decisions and error slicer samples for each first clocking location until a first window edge is identified;

iteratively sampling the input signal to generate respective pluralities of data sampler decisions and error slicer samples over a second plurality of clocking locations adjacent to the first plurality of clocking locations, and comparing the respective pluralities of data sampler decisions and error slicer samples for each second clocking location until a second window edge is identified; and determining the effective clock mismatch window according to the first window edge and the second window edge; and applying a clocking offset to at least one of the data slicing subsystem or the error slicing subsystem as a function of the determined effective clock mismatch window.

11. The method of claim 10, wherein iteratively sampling the input signal to generate respective pluralities of data sampler decisions and error slicer samples over the first and second plurality of clocking locations, and comparing the respective pluralities of data sampler decisions and error slicer samples for each first and second clocking location until the first and second window edges are identified comprises:

shifting the clocking signal to each of the first and second plurality of clocking locations in a shifting direction, and, at each clocking location:

generating a respective plurality of data sampler decisions by sampling the input signal according to the clocking signal using the data slicer subsystem;

generating a respective plurality of error slicer samples by sampling the input signal according to the clocking signal using the error slicing subsystem; and comparing the respective plurality of data sampler decisions with the respective plurality of error slicer samples, wherein the first window edge is identified when, at one of the first clocking locations, the respective plurality of data sampler decisions matches the respective plurality of error slicer samples, and wherein the second window edge is identified when, at one of the second clocking locations, the respective plurality of data sampler decisions does not match the respective plurality of error slicer samples.

12. The method of claim 10, wherein applying the clocking offset to at least one of the data slicing subsystem or the error slicing subsystem comprises temporally shifting sampling by the data slicing subsystem with respect to sampling by the error slicing subsystem in such a way that compensates for effective clock path mismatch between the data slicing subsystem and the error slicing subsystem.

13. The method of claim 10, wherein applying the clocking offset to at least one of the data slicing subsystem or the error slicing subsystem as a function of the determined effective clock mismatch window comprises:

iteratively adjusting a candidate clocking offset applied to one of the data slicing subsystem or the error slicing subsystem, and determining an adjusted effective clock mismatch window at each candidate clocking offset, until the adjusted effective clock mismatch window indicates a minimized effective clock path mismatch.

14. The method of claim 10, wherein comparing the data sampler decisions with the error slicer samples comprises normalizing the data sampler decisions and the error slicer samples to a common reference.

15. The method of claim 14, wherein the normalizing the data sampler decisions and the error slicer samples to a common reference level comprises forcing the estimated signal value used by the error slicing subsystem to the reference level used by the data slicing subsystem.

16. The method of claim 10, wherein generating the clocking signal comprises deriving a reference clock from the input signal and generating the clocking signal as a function of the reference clock.

17. A serializer/deserializer (SERDES) circuit comprising:

a data slicing sub-circuit that operates to generate data sampler decisions by sampling an input signal according to a clocking signal with respect to a reference level, the data slicing sub-circuit having an associated first clock path delay;

an error slicing sub-circuit that operates to generate error slicer samples by sampling the input signal according to the clocking signal with respect to an estimated signal value, the error slicing sub-circuit having an associated second clock path delay; and a calibration subsystem that operates to:
perform iteratively shifted sampling and comparing of the data sampler decisions and the error slicer samples over a plurality of clocking locations to identify first and second window edges from the comparing;
determine an effective clock path mismatch between the first clock path delay of the data slicing sub-circuit and the second clock path delay of the error slicing sub-circuit according to the first window edge and the second window edge; and
calibrate a clocking offset to shift sampling by the data slicing sub-circuit with respect to sampling by the error slicing sub-circuit in such a way that at least partially compensates for the effective clock path mismatch.

18. The SERDES circuit of claim 17, wherein performing iteratively shifted sampling and comparing of the data sampler decisions and the error slicer samples over the plurality of clocking locations comprises normalizing the data sampler decisions and the error slicer samples to a common reference after the sampling and before the comparing.

* * * * *

UNITED STATES PATENT AND TRADEMARK OFFICE
CERTIFICATE OF CORRECTION

| | | |
|---|---|---|
| PATENT NO. | : 9,031,179 B2 | Page 1 of 1 |
| APPLICATION NO. | : 13/936961 | |
| DATED | : May 12, 2015 | |
| INVENTOR(S) | : Su | |

It is certified that error appears in the above-identified patent and that said Letters Patent is hereby corrected as shown below:

In the specification

Column 10, line 2, delete "vise versa)" and insert -- vice versa) --, therefor.

Signed and Sealed this
Ninth Day of February, 2016

Michelle K. Lee
*Director of the United States Patent and Trademark Office*